(12) United States Patent
Youm et al.

(10) Patent No.: US 8,300,717 B2
(45) Date of Patent: Oct. 30, 2012

(54) SAMPLING FREQUENCY OFFSET ESTIMATION APPARATUS AND METHOD OF OFDM SYSTEM

(75) Inventors: Jung Eun Youm, Seoul (KR); Hyung Jin Choi, Seoul (KR); Jung Soo Han, Gyunggi-do (KR); Kyung Hoon Won, Gyunggi-Do (KR); Hyun Suk Lee, Gyunggi-Do (KR); Jae Goon Aum, Gyunggi-Do (KR)

(73) Assignees: Samsung Electro-Mechanics Co., Ltd., Gyunggi-do (KR); Sungkyunkwan University Foundation for Corporate Collaboration, Gyunggi-do (KR)

( * ) Notice: Subject to any disclaimer, the term of this patent is extended or adjusted under 35 U.S.C. 154(b) by 664 days.

(21) Appl. No.: 12/492,282

(22) Filed: Jun. 26, 2009

(65) Prior Publication Data

US 2010/0158144 A1 Jun. 24, 2010

(30) Foreign Application Priority Data

Dec. 22, 2008 (KR) ........................ 10-2008-0130900

(51) Int. Cl.
*H04K 1/10* (2006.01)
(52) U.S. Cl. ........ 375/260; 375/259; 375/272; 375/285; 327/164; 370/203; 370/208
(58) Field of Classification Search .................... 375/260
See application file for complete search history.

(56) References Cited

U.S. PATENT DOCUMENTS

| | | | | |
|---|---|---|---|---|
| 6,134,286 A | * | 10/2000 | Chennakeshu et al. | 375/365 |
| 6,192,088 B1 | * | 2/2001 | Aman et al. | 375/326 |
| 6,363,084 B1 | * | 3/2002 | Dejonghe | 370/480 |
| 6,693,983 B1 | * | 2/2004 | Moher et al. | 375/341 |
| 6,950,458 B2 | * | 9/2005 | Boloorian | 375/149 |
| 2004/0143612 A1 | * | 7/2004 | Patrick et al. | 708/207 |
| 2006/0023653 A1 | * | 2/2006 | Montalbano | 370/315 |
| 2006/0227917 A1 | * | 10/2006 | Buchwald et al. | 375/355 |
| 2009/0034668 A1 | * | 2/2009 | Ashikhmin et al. | 375/354 |
| 2009/0116592 A1 | * | 5/2009 | Namba et al. | 375/344 |
| 2009/0196166 A1 | * | 8/2009 | Hamaguchi et al. | 370/210 |
| 2010/0027698 A1 | * | 2/2010 | Kim et al. | 375/260 |
| 2010/0183054 A1 | * | 7/2010 | Daly et al. | 375/219 |
| 2010/0284480 A1 | * | 11/2010 | Jia et al. | 375/260 |
| 2011/0064175 A1 | * | 3/2011 | Leyonhjelm et al. | 375/350 |
| 2011/0222504 A1 | * | 9/2011 | Ma et al. | 370/330 |

* cited by examiner

*Primary Examiner* — David Ometz
*Assistant Examiner* — Santiago Garcia
(74) *Attorney, Agent, or Firm* — Lowe, Hauptman, Ham & Berner, LLP

(57) ABSTRACT

A sampling frequency offset estimation apparatus of an orthogonal frequency division multiplexing (OFDM) system includes a first differential operation unit performing complex conjugate multiplication of scattered pilots of complex symbols subjected to a fast Fourier transform (FFT) in an OFDM receiver, an interpolation unit repeating an operation of obtaining a median complex symbol between two consecutive symbols among complex symbols having first phase difference information from the first differential operation unit by a predetermined number, a second differential operation unit performing complex conjugate multiplication of two consecutive median complex symbols among median complex symbols from the interpolation unit, and a sampling frequency offset estimation unit estimating sampling frequency offset using complex symbols having second phase difference information from the second differential operation unit.

5 Claims, 8 Drawing Sheets

SAMPLING FREQUENCY OFFSET ESTIMATION APPARATUS AND METHOD OF OFDM SYSTEM

CROSS-REFERENCE TO RELATED APPLICATIONS

This application claims the priority of Korean Patent Application No. 2008-0130900 filed on Dec. 22, 2008, in the Korean Intellectual Property Office, the disclosure of which is incorporated herein by reference.

BACKGROUND OF THE INVENTION

1. Field of the Invention

The present invention relates to a sampling offset estimation apparatus and method of an orthogonal frequency division multiplexing (OFDM) system that can be applied to digital television reception systems, and more particularly, to a sampling frequency offset estimation apparatus and method of an OFDM system that can reduce noise power and errors caused by noise power by adding an interpolation between first complex conjugate multiplication and second complex conjugate multiplication of a signal subjected to FFT in an OFDM receiver.

2. Description of the Related Art

In general, an OFDM system includes an OFDM transmitter that transforms data symbols using an inverse fast Fourier transform (IFFT) and transmits the data symbols, and an OFDM receiver that performs a fast Fourier transform (FFT) on a signal from the OFDM transmitter to recover data. Here, the OFDM receiver is shown in FIG. 1.

FIG. 1 is a block diagram illustrating a general OFDM receiver. Referring to FIG. 1, the genera OFDM receiver includes an analog-to-digital (A/D) conversion unit 10 that samples a received signal according to the sampling frequency to convert the received signal into a digital signal, a serial-to-parallel conversion unit 20 that converts the signal from the A/D conversion unit 10 so that serial format is converted into parallel format, a guard interval removal unit 30 that removes a guard interval from the signal from the serial-to-parallel conversion unit 20, an FFT unit 40 that performs an FFT on the signal from the guard interval removal unit 30, a sampling frequency offset estimation unit 50 that estimates sampling frequency offset $\hat{\eta}_m$ using signals $Z_{m,k}$ from the FFT unit 40, a loop filter 60 that filters a sampling frequency offset estimation value from the sampling frequency offset estimation unit 50, and a local oscillation unit 70 that varies the sampling frequency according to the sampling frequency offset estimation value from the loop filter 60 and supplies the varied sampling frequency to the A/D conversion unit 10.

The A/D conversion unit 10 includes a sampler sampling the received signal according to the sampling frequency and an A/D converter 12 converting the signal sampled by the sampler 11 into a digital signal.

In the above-described OFDM system, sampling in the time domain needs to be performed beforehand in order to demodulate data. A sampling phase offset and a sampling frequency offset that are generated due to sampling errors between the OFDM transmitter and the OFDM receiver cause performance deterioration of the OFDM system. Therefore, the sampling frequency offset needs to be corrected.

FIG. 2 is a view illustrating a frame structure of an OFDM signal. Referring to FIG. 2, a super-frame of an OFDM signal consists of four frames (frame 1 to frame 4). Each of the four frames consists of 68 symbols (symbol 0 to symbol 67). Each of the 68 symbols consists of a guard interval (GI) 21 and a valid data interval 22 having a plurality of cells.

Here, the valid data interval 22 includes 2048 cells (cell0 to cell2047) for 2K mode, and the valid data interval 22 includes 8192 cells (cell0 to cell8191) for 8K mode.

Further, the guide interval 21 is copied to the final portion of the valid data interval 22.

FIG. 3 is a structural view illustrating pilots and data of OFDM symbols. Referring to FIG. 3, an OFDM symbol consists of 6817 subcarriers for 8K mode and 1705 subcarriers for 2K mode.

One symbol includes continuous pilots 31, scattered pilots 32 and subcarriers 33 having data.

In a DVB-T/H system, the continuous pilots 31 and the scattered pilots 32 of the OFDM symbol are modulated by a pseudo-random binary sequence (PRBS) according to Equation 1, and the modulated continuous pilots and scattered pilots are boosted and then transmitted. Here, a polynomial equation used to obtain a PRBS is shown as follows: $X^{11}+X^2+1$.

$$Re\{C_{m,k}\}=4/3\times2(1/2-\rho_k), Im\{C_{m,k}\} \quad \text{Equation 1}$$

where m is a symbol number, k is a subcarrier number and $\rho_k$ is a k-th reference sequence bit corresponding to a k-th subcarrier.

Referring to FIG. 3, the position of the scattered pilots 32 is determined according to Equation 2. The arrangement of the scattered pilots 32 is repeated every four symbols, and each of the scattered pilots is assigned at an interval of 12 subcarriers within one symbol. In 8K mode, 177 continuous pilots 31 are assigned at fixed positions, and in 2K mode, 45 continuous pilots are assigned at fixed positions.

$$k=K_{min}+3\times(m\,mod4)+12p$$

$$\text{where } p \text{ integer}, p \geq 0, k \in [K_{min}; K_{max}] \quad \text{Equation 2}$$

Referring to FIGS. 1 through 3, in the OFDM receiver, on the assumption that another synchronization process other than sampling is completely performed, complex symbols $Z_{m,k}$ in the frequency domain where the sampling frequency offset is generated satisfy the following Equation 3.

$$z_{m,k} = H_{m,k} \cdot a_{m,k} \cdot \frac{\sin(\pi k \eta)}{N\sin\left(\frac{\pi k \eta}{N}\right)} \cdot \exp\left(j\frac{2\pi k}{N}(mN_s + N_g)\eta\right) +$$

$$\sum_{i=0, i\neq k}^{N-1} H_{m,k} \cdot a_{m,k} \cdot \frac{\sin\pi(i+k(\eta-1))}{N\sin\left(\frac{\pi(i+k(\eta-1))}{N}\right)} \cdot$$

$$\exp\left(j\pi\frac{(i+k(\eta-1))(N-1)}{N}\right) + W_{m,k}$$

Equation 3 where $\eta$ is relative sampling frequency offset, expressed as "$\eta=(T'-T)/T$", T is a rated sample period, T' is a sampling period of the receiver where offset is generate, $H_{m,k}$ is channel frequency response (CFR) of a multipath fading channel, and $W_{m,k}$ is additive white Gaussian noise (AWGN) when mean is zero and variance is $\sigma^2$, N is the FFT size, "$N_g$" is the length of a guard interval, and "$N_s=N+N_g$" is the length of an OFDM symbol.

According to a general sampling frequency offset estimation method in this OFDM system, when continuous pilots are used, frequency offset is estimated using the phase rotation difference between pilots having the same positions in two consecutive OFDM symbols in the frequency domain. An estimation value $\hat{\eta}_m$ of the sampling frequency offset is obtained according to Equation 4:

$$\hat{\eta}_m = \frac{N}{2\pi b_k N_s(N_{cp}-1)} \sum_{k=0}^{N-1} \tan^{-1}(R_{m,k}), k \in S_{cp}$$

$$R_{m,k} = (z_{m+1,k+b_k} \cdot z^*_{m,k+b_k}) \cdot (z_{m+1,k} \cdot z^*_{m,k})^* =$$

$$\exp[j(2\pi b_k N_s/N)\eta]$$

Equation 4 where $S_{cp}$ is a set of continuous pilots, $N_{cp}$ is the number of continuous pilots, and $b_k$ is spacing between continuous pilots.

In the DVB-T/H system, scattered pilots may also be used for the sampling frequency offset estimation. Since the number of scattered pilots is greater than that of continuous pilots, sampling frequency offset estimation can be more accurately performed. When scattered pilots are used, the estimation value $\hat{\eta}_m$ of the sampling frequency offset satisfies the following Equation 5:

$$\hat{\eta}_m = \frac{N}{2\pi b N_s(N_{sp}-1)} \sum_{k=0}^{N-1} \tan^{-1}(R_{m,k}), k \in S_{sp}$$

$$R_{m,k} = (z_{m+1,k+b+3} \cdot z^*_{m,k+b}) \cdot (z_{m+1,k+3} \cdot z^*_{m,k})^* =$$

$$\exp[j(2\pi b N_s/N)\eta]$$

Equation 5 where $S_{sp}$ is a set of scattered pilots, $N_{sp}$ is the number of scattered pilots, and b is 12, which is spacing between scattered pilots within one symbol.

However, the general sampling frequency offset estimation method results in signal to noise ratio (SNR) loss due to increases in noise and inter-carrier interference (ICI) components when performing complex conjugate multiplication between adjacent symbols. Furthermore, the channel frequency response (CFR) may not be completely removed by complex conjugate multiplication at high Doppler frequency.

In addition, since these remaining CFR components are multiplied by signal components, they cause significant errors in the estimation. As a result, the result of complex conjugate multiplication performed twice satisfies the following Equation 6:

$$Z_{m,k} = H_{m,k} \cdot S_{m,k} + H_{m,k} \cdot ICI_{m,k} + W_{m,k} = H_{m,k} \cdot S_{m,k} + V_{m,k}$$
$$(Z_{m+1,k+d_{sp}} \cdot Z^*_{m,k+d_{sp}}) \cdot (Z_{m+1,k} \cdot Z^*_{m,k})^* = \hat{H}_{m,k} \cdot S_{m,k} + \hat{V}_{m,k}$$

Equation 6 where $\hat{H}_{m,k}$ is obtained by raising the CFR to the fourth power, $\hat{V}_{m,k}$ is undesirable components formed by combining CFR and pilot signals, ICI components and AWGN components. These components need to be removed.

As described above, referring to Equation 6, the sampling frequency offset estimation method according to the related art causes deterioration in estimation performance at low SNR and high Doppler frequency.

SUMMARY OF THE INVENTION

An aspect of the present invention provides a sampling frequency offset estimation apparatus and method of an OFDM system that can reduce noise power and errors caused by noise power by interposing interpolation between first complex conjugate multiplication and second complex conjugate multiplication of a signal subjected to an FFT in an OFDM receiver, and can prevent performance deterioration at low signal to noise ratio (SNR).

According to an aspect of the present invention, there is provided a sampling frequency offset estimation apparatus of an orthogonal frequency division multiplexing (OFDM) system, the apparatus including: a first differential operation unit performing complex conjugate multiplication of scattered pilots of complex symbols subjected to a fast Fourier transform (FFT) in an OFDM receiver; an interpolation unit repeating an operation of obtaining a median complex symbol between two consecutive symbols among complex symbols having first phase difference information from the first differential operation unit by a predetermined number; a second differential operation unit performing complex conjugate multiplication of two consecutive median complex symbols among median complex symbols from the interpolation unit; and a sampling frequency offset estimation unit estimating sampling frequency offset using complex symbols having second phase difference information from the second differential operation unit.

The interpolation unit may obtain median complex symbols between the two complex symbols and obtain median complex symbols between the median complex symbols having been obtained in the previous operation when the predetermined number is set to 2.

The interpolation unit may obtain median complex symbols between the two complex symbols and repeat an operation of obtaining a median complex symbol between the median complex symbols by "predetermined number-1" when the predetermined number is set to 3 or more.

The sampling frequency offset estimation unit may take the arctangent of the complex symbols having the second phase difference information from the second differential operation unit, add the results and multiply the sum by $$\frac{1}{2\pi Nt}$$

to estimate the sampling frequency offset, where $Nt = b_{sp} N_s (N_{sp} - N_a - 1)$ is satisfied, $b_{sp}$ is spacing between scattered pilots (b is spacing between pilots), $N_s$ is the length of an OFDM symbol (N is the length of the FFT), $N_{sp}$ is the number of scattered pilots, and $N_a$ is the number of interpolations being performed.

According to another aspect of the present invention, there is provided a sampling frequency offset estimation method in an OFDM system, the method including: performing a first differential operation by performing complex conjugate multiplication of scattered pilots of complex symbols subjected to an FFT in an OFDM receiver; performing interpolation by repeating an operation of obtaining a median complex symbol between two consecutive complex symbols having first phase difference information obtained by the first differential operation by a predetermined number; performing a second differential operation by performing complex conjugate multiplication of two consecutive median complex symbols among the median complex symbols obtained by performing the interpolation; and performing sampling frequency offset estimation by estimating sampling frequency offset using complex symbols having second phase difference information obtained by performing the second differential operation.

The performing of the interpolation may include: performing a first interpolation to obtain median complex symbols between the two complex symbols; and performing a second interpolation to obtain median complex symbols between the median complex symbols having been obtained in the previous operation, and the second interpolation may be repeated by "predetermined number-1."

The performing of the sampling frequency offset estimation may include taking the arctangent of the complex symbols having the second phase difference information obtained by the second differential operation, adding the results and multiplying the sum by $$\frac{1}{2\pi Nt}$$

to estimate the sampling frequency offset, where $Nt = b_{sp}N_s(N_{sp}-N_a-1)$ is satisfied, $b_{sp}$ is spacing between scattered pilots (b is spacing between pilots), $N_s$ is the length of an OFDM symbol (N is the length of FFT), $N_{sp}$ is the number of scattered pilots, and $N_a$ is the number of interpolations being performed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
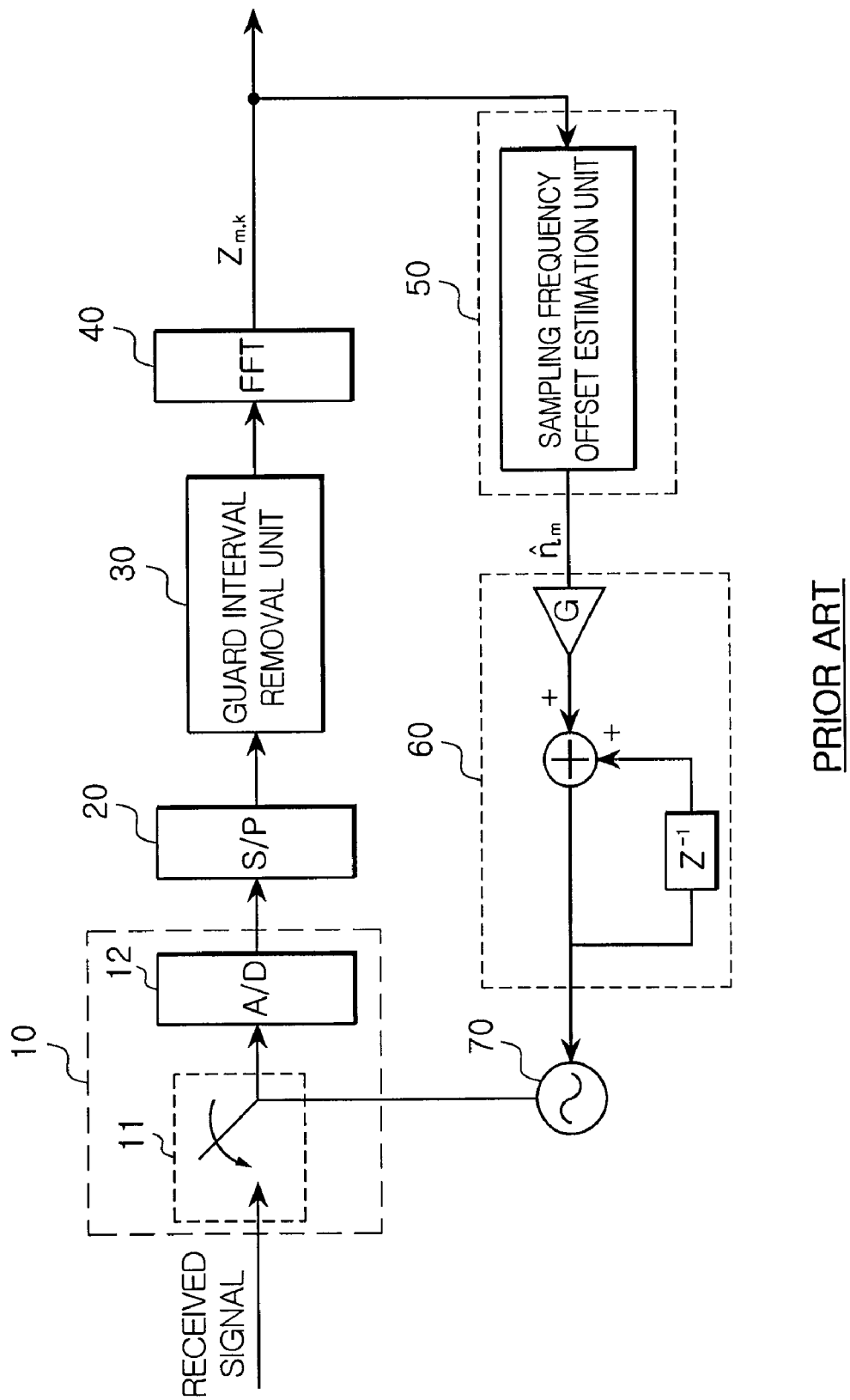
FIG. 1 is a block diagram illustrating a general OFDM receiver.
Figure 2:
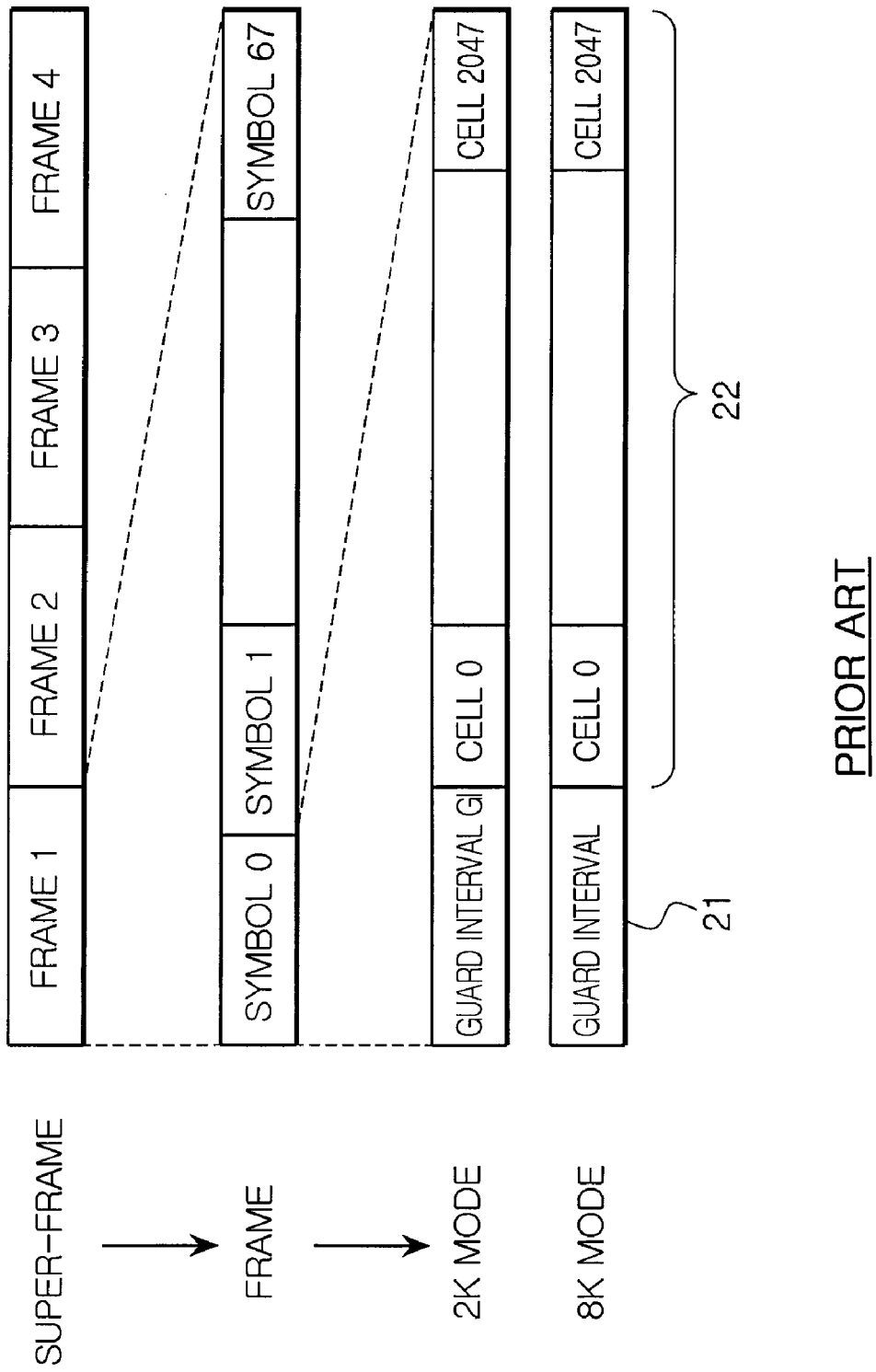
FIG. 2 is a view illustrating a frame structure of an OFDM signal.
Figure 3:
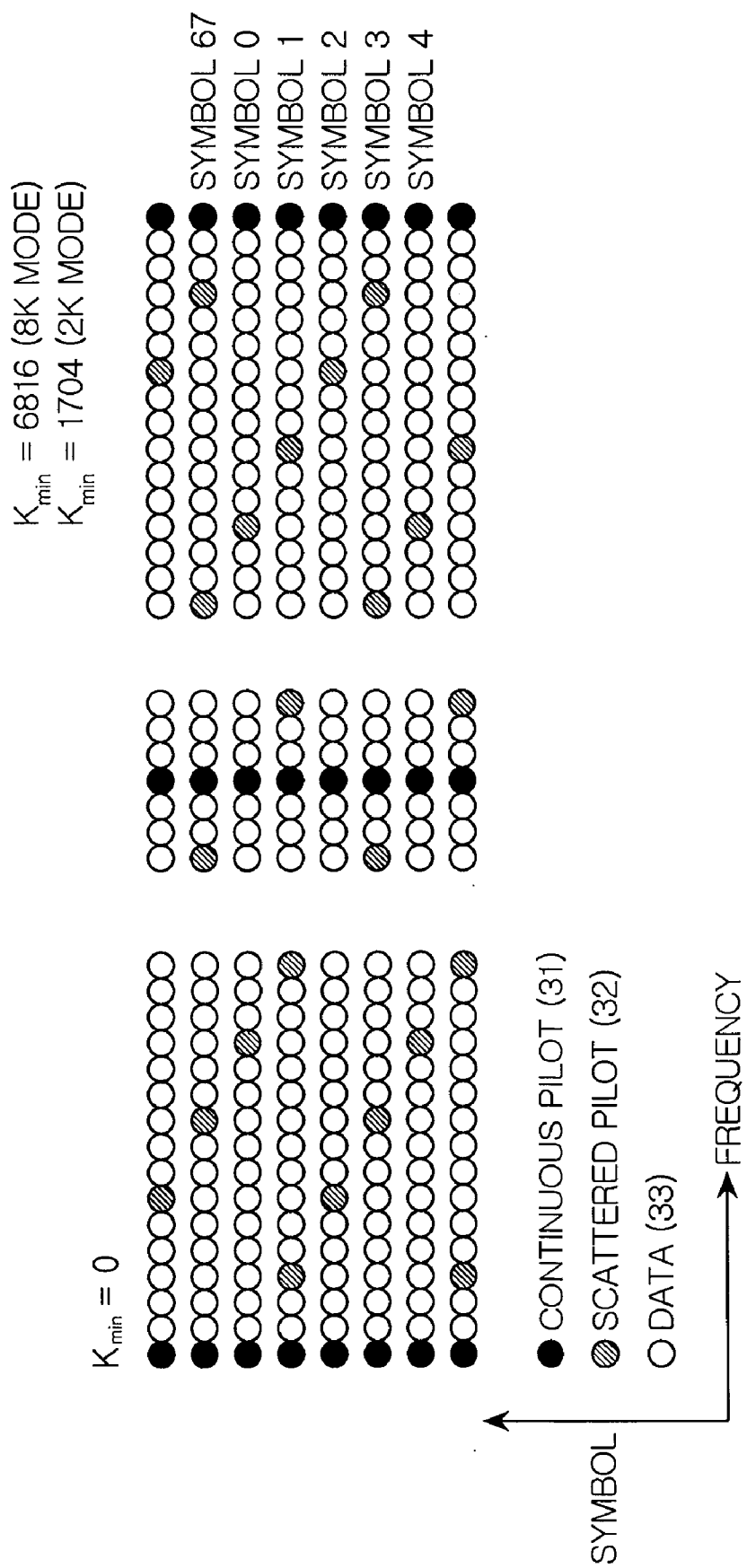
FIG. 3 is a structural view showing pilots and data of OFDM symbols.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 4:
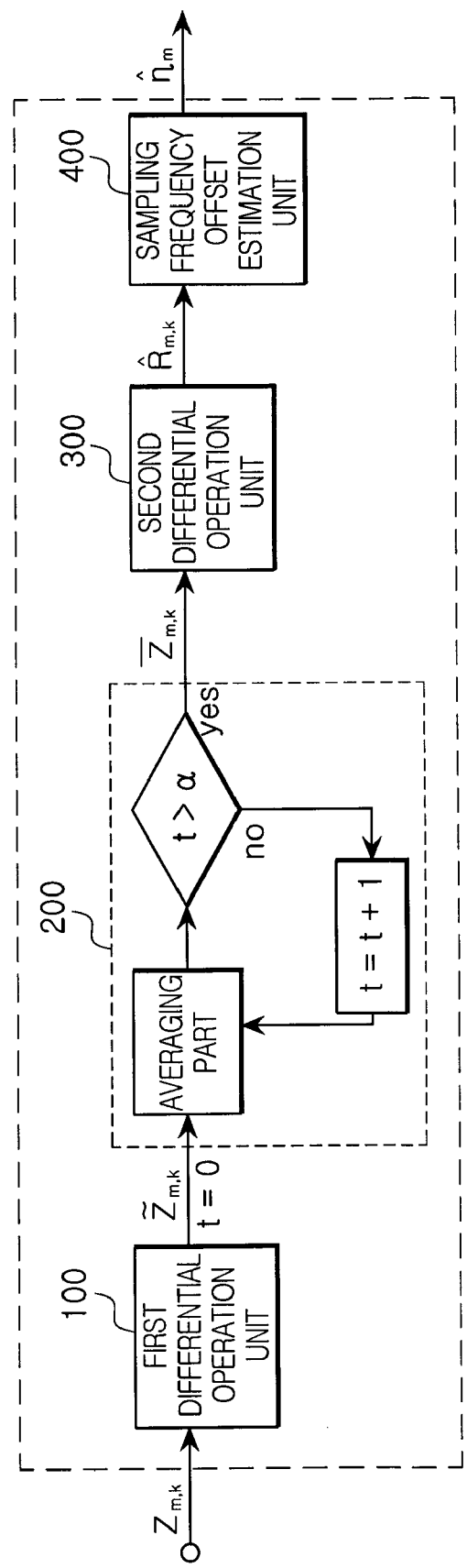
FIG. 4 is a block diagram illustrating a sampling frequency offset estimation apparatus according to an exemplary embodiment of the invention.

FIG. 4 is a block diagram illustrating a sampling frequency offset estimation apparatus according to an exemplary embodiment of the invention. Referring to FIG. 4, the sampling frequency offset estimation apparatus according to this embodiment includes a first differential operation unit 100, an interpolation unit 200, a second differential operation unit 300 and a sampling frequency offset estimation unit 400. The first differential operation unit 100 performs complex conjugate multiplication of scattered pilots of complex symbols $Z_{m,k}$ subjected to an FFT in an OFDM receiver. The interpolation unit 200 repeats an operation of obtaining a median complex symbol between two consecutive complex symbols $\tilde{Z}_{m,k}$ and $\tilde{Z}_{m,k+12}$ having first phase difference information $\Phi 1$ among the complex symbols $\tilde{Z}_{m,k}$ from the first differential operation unit 100 by a predetermined number. The second differential operation unit 300 performs complex conjugate multiplication of two consecutive median complex symbols $\overline{Z}_{m,k}$ and $\overline{Z}_{m,k+12}$ among median complex symbols $\overline{Z}_{m,k}$ from the interpolation unit 200. The sampling frequency offset estimation unit 400 estimates sampling frequency offset $\hat{\eta}_m$ using complex symbols $\hat{R}_{m,sp}$ having second phase difference information $\phi 2$ from the second differential operation unit 300.

For example, when the predetermined number is set to 2, the interpolation unit 200 obtains median complex symbols between the two complex symbols $\tilde{Z}_{m,k}$ and $\tilde{Z}_{m,k+12}$ and then obtains median complex symbols between the median complex symbols that have been obtained in the previous operation.

In another example, when the predetermined number is set to 3, the interpolation unit 200 obtains median complex symbols between the two complex symbols $\tilde{Z}_{m,k}$ and $\tilde{Z}_{m,k+12}$, and then repeats an operation of obtaining a median complex symbol between the median complex symbols by "predetermined number-1."

The sampling frequency offset estimation unit 400 takes the arctangent of the complex symbols $R_{m,sp}$ having the second phase difference information $\phi 2$ from the second differential operation unit 300, adds the results and multiplies the sum by $$\frac{1}{2\pi Nt}$$

to estimate the sampling frequency offset $\hat{\eta}_m$.

Figure 5:
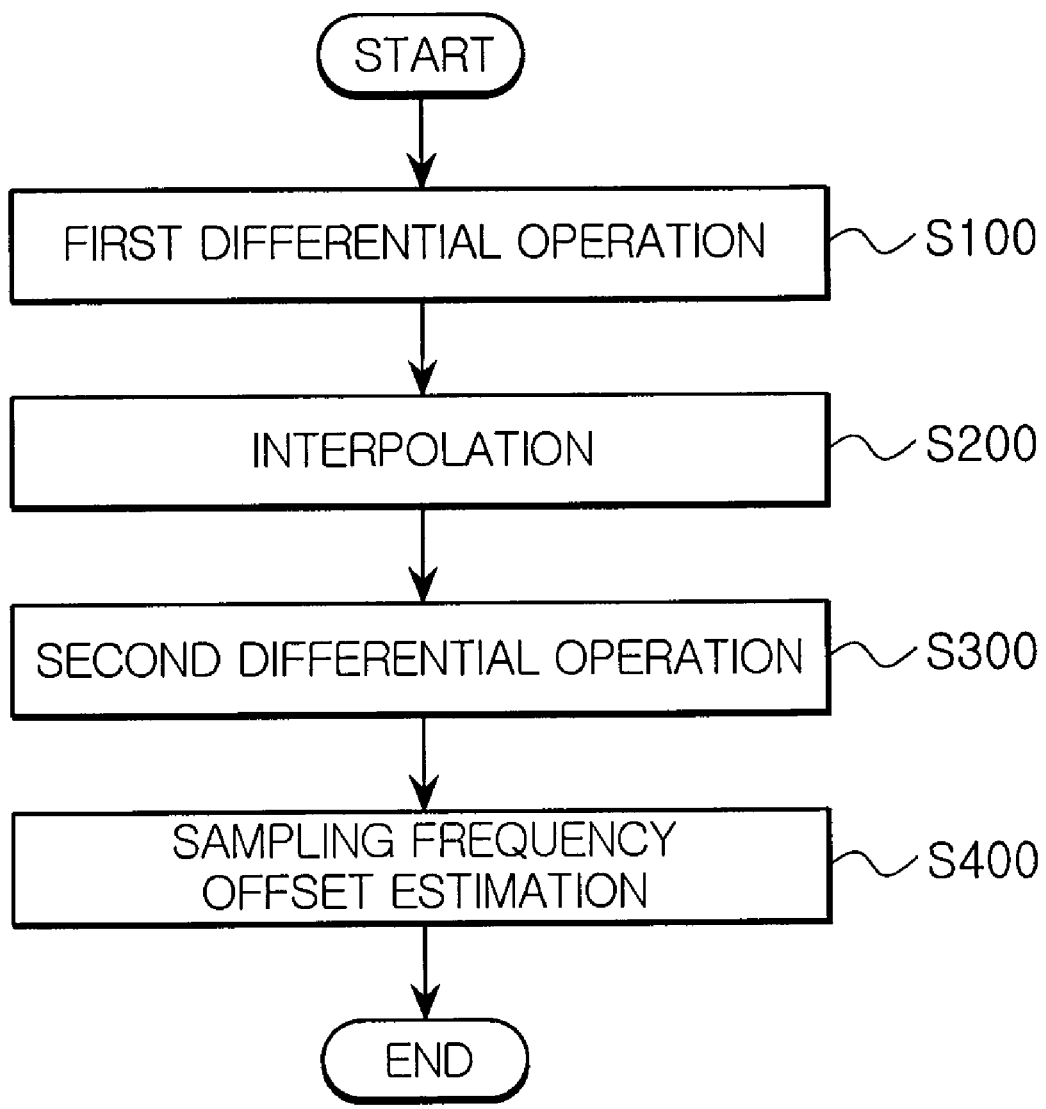
FIG. 5 is a flowchart illustrating a sampling frequency offset estimation method according to an exemplary embodiment of the invention.

FIG. 5 is a flowchart illustrating a sampling frequency offset estimation method according to an exemplary embodiment of the invention.

Referring to FIG. 5, the sampling frequency offset estimation method according to this embodiment includes a first differential operation in which complex conjugate multiplication is performed on scattered pilots of complex symbols $Z_{m,k}$ subjected to an FFT in an OFDM receiver (S100), interpolation in which an operation of obtaining a median complex symbol between two consecutive complex symbols $\tilde{Z}_{m,k}$ and $\tilde{Z}_{m,k+12}$ among the complex symbols $\tilde{Z}_{m,k}$ having first phase difference information $\phi 1$ from the first differential operation S100 is repeated by a predetermined number (S200), a second differential operation in which complex conjugate multiplication is performed on two consecutive median complex symbols $\overline{Z}_{m,k}$ and $\overline{Z}_{m,k+12}$ among median complex symbols $\overline{Z}_{m,k}$ obtained in operation S200 (S300), and sampling frequency offset estimation in which sampling frequency offset $\hat{\eta}_m$ is estimated using complex symbols $\hat{R}_{m,sp}$ having second phase difference information $\phi 2$ obtained in operation S300 (S400).

In operation S200, a first interpolation to obtain median complex symbols between the two complex symbols $\tilde{Z}_{m,k}$ and $\tilde{Z}_{m,k+12}$ is performed and a second interpolation to obtain median complex symbols between the median complex symbols that have been obtained in the previous operation is then performed. The second interpolation is repeated by "predetermined number-1."

The sampling frequency offset estimation S400 takes the arctangent of the complex symbols $R_{m,sp}$ having second phase difference information φ2 from the second differential operation S300, adds the results and multiplies the sum by $$\frac{1}{2\pi Nt}$$

to assume the sampling frequency offset $\hat{\eta}_m$.

Figure 6:
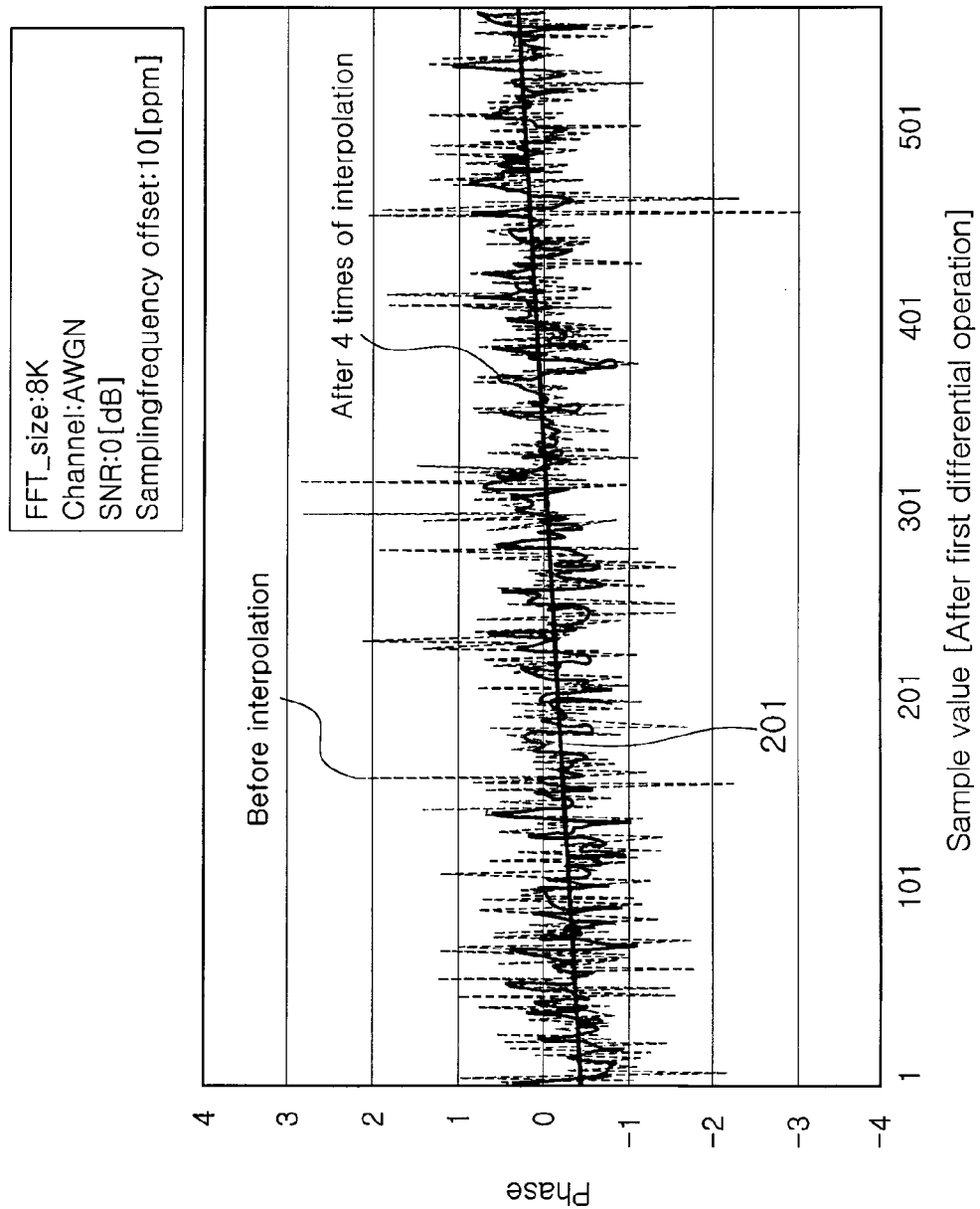
FIG. 6 illustrates phase characteristic graphs of samples according to the invention.

FIG. 6 illustrates phase characteristic graphs of samples according to the invention.

In FIG. 6, there are differences between phase changes (related art) before an interpolation after the first differential operation is performed and phase changes (present invention) after an interpolation is performed four times.

Figure 7:
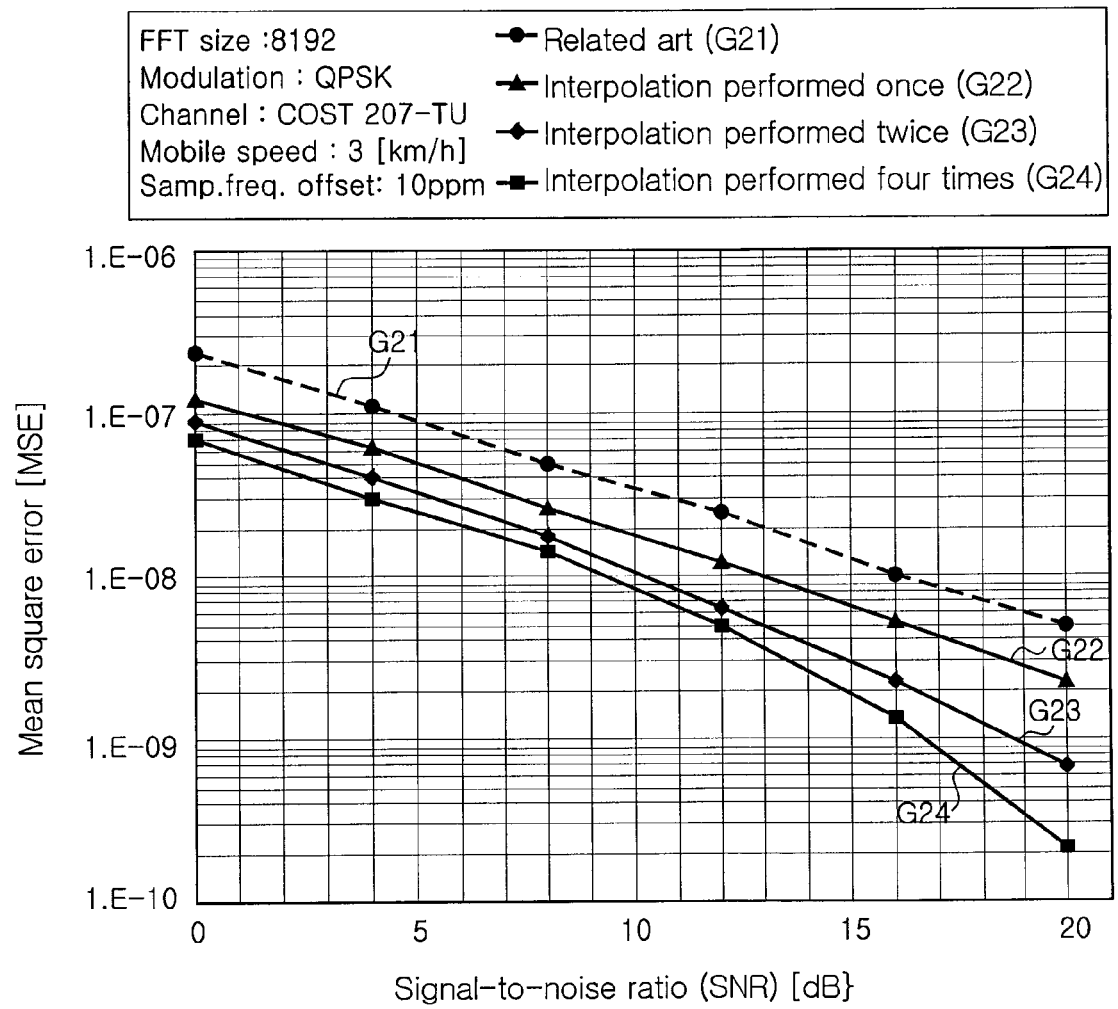
FIG. 7 is a signal-to-noise ratio (SNR) versus mean square error (MSE) performance graph according to the number of interpolations being performed according to an exemplary embodiment of the invention.

FIG. 7 is a signal-to-noise ratio (SNR) versus mean square error (MSE) performance graph. In FIG. 7, a graph G21 is an SNR versus MSE performance graph, a graph G22 is an SNR versus MSE performance graph after an interpolation is performed once according to the invention, a graph G23 is an SNR versus MSE performance graph after interpolation is performed twice according to the invention, and a graph G24 is an SNR versus MSE performance graph after interpolation is performed four times according to the invention.

Figure 8:
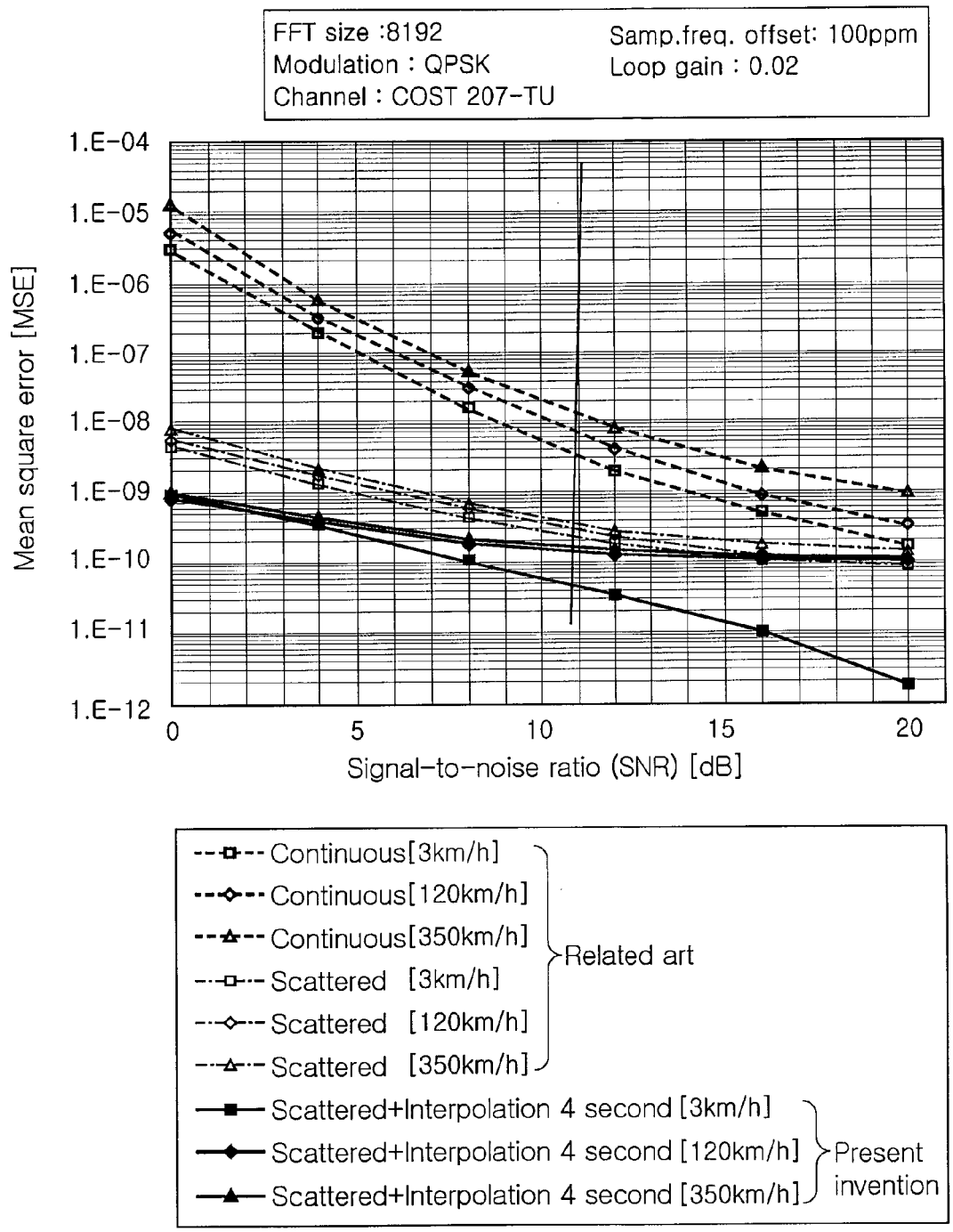
FIG. 8 is an SNR versus MSE performance graph according to mobile speed according to an exemplary embodiment of the invention.

FIG. 8 illustrates SNR versus MSE performance graphs according to mobile speed according to an exemplary embodiment of the invention. In FIG. 8, there are six SNR versus MSE performance graphs according to mobile speed according to the related art and three SNR versus MSE performance graphs according to mobile speed according to the invention.

Hereinafter, the operation and effect of the invention will be described in detail with reference to the accompanying drawings.

In FIG. 4, the sampling frequency offset estimation apparatus according to the embodiment of the invention includes the first differential operation unit 100, the interpolation unit 200, the second differential operation unit 300 and the sampling frequency offset estimation unit 400.

The first differential operation unit 100 performs complex conjugate multiplication of scattered pilots of complex symbols $Z_{m,k}$ subjected to the FFT in the OFDM receiver. That is, the first differential operation unit 100 obtains first phase difference information φ1 between scattered pilots of two consecutive complex symbols $Z_{m,k}$ and $Z_{m+1,k+3}$ among the complex symbols $Z_{m,k}$ subjected to the FFT, and then obtains complex symbol $\tilde{Z}_{m,k}$ having the first phase difference information φ1 according to Equation 7:

$$Z_{m,k} \cdot S_{m,k} + H_{m,k} \cdot ICI_{m,k} + W_{m,k} = H_{m,k} \cdot S_{m,k} + V_{m,k}$$

$$\tilde{Z}_{m,k} = (Z_{m+1,k} \cdot Z_{m,k}^*) = \tilde{H}_{m,k} \cdot \tilde{S}_{m,k} + \tilde{V}_{m,k} \quad \text{Equation 7}$$

The interpolation unit 200 repeats an operation of obtaining a median complex symbol between two consecutive complex symbols $\tilde{Z}_{m,k}$ and $\tilde{Z}_{m,k+12}$ among the complex symbols $\tilde{Z}_{m,k}$ having the first phase difference information φ1 from the first differential operation unit 100 by a predetermined number.

Here, the predetermined number may be set between 1 and 10. The number greater than 1 may improve accuracy and at the same time, increase the calculation amount to decrease the calculation speed.

For example, when the predetermined number is set to 2, the interpolation unit 200 obtains median complex symbols between the two complex symbols $\tilde{Z}_{m,k}$ and $\tilde{Z}_{m,k+12}$ and then obtains median complex symbols between the median complex symbols that have been obtained in the previous operation.

In another example, when the number is set to 3 or more, the interpolation unit 200 obtains median complex symbols between the two complex symbols $\tilde{Z}_{m,k}$ and $\tilde{Z}_{m,k+12}$ and then repeats an operation of obtaining a median complex symbol between the median complex symbols by "predetermined number-1." Here, the median complex symbols may be obtained according to Equation 8:

$$\overline{Z}_{m,k} = \frac{(\tilde{Z}_{m,k} + \tilde{Z}_{m,k+12})}{2} \quad \text{Equation 8}$$

The second differential operation unit 300 performs complex conjugate multiplication of two consecutive median complex symbols $\overline{Z}_{m,k}$ and $\overline{Z}_{m,k+12}$ among the median complex symbols $\overline{Z}_{m,k}$ from the interpolation unit 200.

That is, the second differential operation unit 300 obtains second phase difference information φ2 of the two consecutive complex symbols $\overline{Z}_{m,k}$ and $\overline{Z}_{m,k+12}$ among the complex symbols $\overline{Z}_{m,k}$ from the interpolation unit 200, and obtains the complex symbols $R_{m,sp}$ having the second phase difference information φ2 according to Equation 9:

$$\tilde{R}_{m,k} = (\overline{Z}_{m,k}) + (\overline{Z}_{m,k+12}) \quad \text{Equation 9}$$

The sampling frequency offset estimation unit 400 estimates sampling frequency offset $\hat{\eta}_m$ using the complex symbols $\hat{R}_{m,sp}$ having the second phase difference information φ2 from the second differential operation unit 300.

Specifically, the sampling frequency offset estimation unit 400 takes the arctangent of the complex symbols $R_{m,sp}$ having the second phase difference information φ2 from the second differential operation unit 300, adds the results and multiplies the sum by $$\frac{1}{2\pi Nt}$$

to estimate the sampling frequency offset $\hat{\eta}_m$ according to Equation 10:

$$\hat{\eta}_m = \frac{N}{2\pi Nt} \sum_{sp=0}^{N_{sp}-N_a-1} \tan^{-1}[\tilde{R}_{m,k}] \quad \text{Equation 10}$$

where $Nt=b_{sp}N_s(N_{sp}-N_a-1)$ is satisfied, is spacing between scattered pilots (b is spacing between pilots), $N_s$ is the length of an OFDM symbol (N is the length of the FFT), $N_{sp}$ is the number of scattered pilots, and $N_s$ is the number of interpolations being performed.

Hereinafter, the sampling frequency offset estimation method according to the embodiment of the invention will be described.

Referring to FIG. 5, the sampling frequency offset estimation method includes the first differential operation S100, the interpolation S200, the second differential operation S300 and the sampling frequency offset estimation S400.

First, referring to FIG. 5, the first differential operation S100 performs complex conjugate multiplication of the scattered pilots of the complex symbols $Z_{m,k}$ subjected to the FFT in the OFDM receiver.

That is, in operation S100, the first phase difference information $\phi 1$ between the scattered pilots of the two consecutive complex symbols $Z_{m,k}$ and $Z_{m+1,k+3}$ among the complex symbols $Z_{m,k}$ subjected to the FFT is obtained, and complex symbols $\tilde{Z}_{m,k}$ having the first phase difference information $\phi 1$ is then obtained according to Equation 7.

In operation S200, an operation of obtaining a median complex symbol between the two consecutive complex symbols $\tilde{Z}_{m,k}$ and $\tilde{Z}_{m,k+12}$ among the complex symbols $\tilde{Z}_{m,k}$ having the first phase difference information $\phi 1$ from the first differential operation S100 is repeated by a predetermined number.

Here, the predetermined number may be set between 1 and 10. The predetermined number greater than 1 may improve accuracy and at the same time, increase the operation amount to reduce operation speed.

Specifically, the operation S200 includes a first interpolation to obtain median complex symbols between the two complex symbols $\tilde{Z}_{m,k}$ and $\tilde{Z}_{m,k+12}$ and a second interpolation to obtain median complex symbols between the median complex symbols that have been obtained in the previous operation. Here, the second interpolation is repeated by "predetermined number-1."

The interpolation is performed based on the fact that phase rotation of a received signal increases linearly due to the sampling frequency offset as the subcarrier index increases.

That is, as shown in Equation 7, signal components $S_{m,k}$ and noise compositions $W_{m,k}$ are statistically independent in the complex symbols $Z_{m,k}$ where the sampling frequency offset is present. Therefore, the noise compositions $V_{m,k}$ that remain after the multiplication operation is performed can be reduced by interpolating the complex symbols $Z_{m,k}$, received before the multiplication, in the frequency domain.

In operation S300, complex conjugate multiplication is performed on the two consecutive median complex symbols $\overline{Z}_{m,k}$ and $\overline{Z}_{m,k+12}$ among the median complex symbols $\overline{Z}_{m,k}$ from the interpolation S200.

That is, in operation S300, second phase difference information $\phi 2$ of the two consecutive complex symbols $\overline{Z}_{m,k}$ and $\overline{Z}_{m,k+12}$ among the complex symbols $\overline{Z}_{m,k}$ obtained in operation S200 is obtained, and complex symbols $R_{m,sp}$, having the second phase difference information $\phi 2$, are then obtained according to Equation 9.

In operation S400, the sampling frequency offset $\hat{\eta}_m$ is estimated using the complex symbols $\hat{R}_{m,sp}$ having the second phase difference information $\phi 2$ from the second differential operation S300.

For example, in operation S400, the sampling frequency offset estimation is performed by taking the arctangent of the complex symbols $R_{m,sp}$ of the second phase difference information $\phi 2$ from the second differential operation S300, adding the results and multiplying the sum by $$\frac{1}{2\pi Nt}$$

to estimate the sampling frequency offset $\hat{\eta}_m$ according to Equation 10.

In operation S400, complex conjugate multiplication needs to be performed twice. The phase rotations of signals before and after the first complex conjugate multiplication increase linearly as the subcarrier index increases.

Therefore, interpolation can be applied to two points, that is, before and after the first complex conjugate multiplication. However, if the interpolation is performed before the first complex conjugate multiplication, the difference in convergence value between two symbols increases as the predetermined number increases, it may be difficult to improve estimation performance. Therefore, in order to increase performance by repetitive operations, it is appropriate to apply an interpolation to signals after the first complex conjugate multiplication is performed.

The effect of the above-described sampling frequency offset estimation apparatus and method according to the invention will be described with reference to FIGS. 6 through 8.

Referring to FIG. 6, the phase changes after an interpolation is performed four times according to the invention are much smaller than those before interpolation after the first differential operation is performed according to the related art.

The simulation experiments to prove the performance of the sampling frequency offset estimation method of the OFDM system according to the invention exhibited statistical performance numbers by sufficiently repeating processes in a multipath fading channel environment that randomly changes. The experimental results will be described with reference to FIGS. 7 and 8.

First, referring to FIG. 7, in comparison with the SNR versus MSE performance graph G21 according to the related art, performance is improved when the number of interpolations being performed increases with reference to the SNR versus MSE performance graph G22 obtained after an interpolation is performed once according to the invention, the SNR versus MSE performance graph G23 obtained after an interpolation is performed twice according to the invention and the SNR versus MSE performance graph G24 obtained after an interpolation is performed four times according to the invention.

Referring to FIG. 8, in comparison with the six graphs showing the SNR versus MSE performance according to mobile speed according to the related art, the three graphs showing SNR versus MSE performance according to mobile speed according to the invention show better performance than the related art, and show better performance at a mobile speed of 3 Km/h to 350 Km/h than the related art.

Therefore, with reference to FIGS. 7 and 8, the sampling frequency offset estimation method according to the embodiment of the invention can achieve reliable estimation and correction even at low SNR and high mobile speed in comparison with sampling frequency offset estimation method according to the related art.

As described above, this invention relates to a method of preventing deterioration in performance of a system caused by amplification of noise power generated during the operation process in the sampling frequency offset estimation method of an orthogonal frequency division multiplexing (OFDM) system. Here, errors caused by noise are effectively removed using interpolation when estimating the sampling frequency offset. An interpolation block being used has a simplified structure and allows improving estimation performance by repetitive operations. Estimation can be stably performed by applying this invention at relatively low SNR and high Doppler frequency.

As set forth above, according to exemplary embodiments of the invention, in an OFDM receiver, interpolation is interposed between first complex conjugate multiplication and second complex conjugate multiplication of signals subjected to an FFT, thereby reducing noise power, reducing errors caused by noise power and preventing performance deterioration at low SNR.

While the present invention has been shown and described in connection with the exemplary embodiments, it will be apparent to those skilled in the art that modifications and variations can be made without departing from the spirit and scope of the invention as defined by the appended claims.

What is claimed is:

1. A sampling frequency offset estimation apparatus for an orthogonal frequency division multiplexing (OFDM) system, the apparatus comprising:
    a first differential operation unit configured to perform complex conjugate multiplication of scattered pilots of complex symbols subjected to a fast Fourier transform (FFT) in an OFDM receiver;
    an interpolation unit configured to repeat, for a predetermined, first number of times, an operation of obtaining a median complex symbol between two consecutive symbols among complex symbols having first phase difference information from the first differential operation unit;
    a second differential operation unit configured to perform complex conjugate multiplication of two consecutive median complex symbols among median complex symbols from the interpolation unit; and
    a sampling frequency offset estimation unit configured to estimate sampling frequency offset using complex symbols having second phase difference information from the second differential operation unit, wherein
    the interpolation unit is configured to obtain median complex symbols between the two complex symbols and to repeat, for a second number of times, an operation of obtaining a median complex symbol between the median complex symbols when the predetermined, first number is set to 3 or more, wherein the second number is the first number minus one.

2. The apparatus of claim 1, wherein the interpolation unit is configured to obtain median complex symbols between the two complex symbols and to obtain median complex symbols between the median complex symbols having been obtained in a previous operation when the predetermined, first number is set to 2.

3. The apparatus of claim 1, wherein the sampling frequency offset estimation unit is configured to take arctangents of the complex symbols having the second phase difference information from the second differential operation unit, to obtain a sum of the arctangents, and to multiply the sum by $$\frac{1}{2\pi Nt}$$

to estimate the sampling frequency offset, where $Nt=b_{sp}N_s(N_{sp}-N_a-1)$ is satisfied, $b_{sp}$ is spacing between scattered pilots (b is spacing between pilots), $N_s$ is the length of an OFDM symbol (N is the length of the FFT), $N_{sp}$ is the number of scattered pilots, and $N_a$ is the number of interpolations being performed.

4. A sampling frequency offset estimation method for an OFDM system, the method comprising:
    performing a first differential operation by performing complex conjugate multiplication of scattered pilots of complex symbols subjected to an FFT in an OFDM receiver;
    performing an interpolation by repeating, for a predetermined, first number of times, an operation of obtaining a median complex symbol between two consecutive complex symbols having first phase difference information obtained by the first differential operation;
    performing a second differential operation by performing complex conjugate multiplication of two consecutive median complex symbols among the median complex symbols obtained by performing the interpolation; and
    performing a sampling frequency offset estimation by estimating sampling frequency offset using complex symbols having second phase difference information obtained by performing the second differential operation, wherein
    the performing a sampling frequency offset estimation comprises taking arctangents of the complex symbols having the second phase difference information obtained by the second differential operation, obtaining a sum of the arctangents, and multiplying the sum by $$\frac{1}{2\pi Nt}$$

to estimate the sampling frequency offset, where $Nt=b_{sp}N_s(N_{sp}-N_a-1)$ is satisfied, $b_{sp}$ is spacing between scattered pilots (b is spacing between pilots), $N_s$ is the length of an OFDM symbol (N is the length of FFT), $N_{sp}$ is the number of scattered pilots, and $N_a$ is the number of interpolations being performed.

5. The method of claim 4, wherein
    the performing an interpolation comprises:
        performing a first interpolation to obtain median complex symbols between the two complex symbols; and
        performing a second interpolation to obtain median complex symbols between the median complex symbols having been obtained in a previous operation, and
    the second interpolation is repeated a second number of times, wherein the second number is the first number minus one.

* * * * *